United States Patent
Luo et al.

(10) Patent No.: US 11,344,803 B1
(45) Date of Patent: May 31, 2022

(54) TECHNIQUES FOR DETERMINING NETWORK LATENCY

(71) Applicant: Amazon Technologies, Inc., Seattle, WA (US)

(72) Inventors: Junwu Luo, Milpitas, CA (US); Yu Du, San Jose, CA (US); Tao Yin, Chaoyang District (CN); Hongxue Ren, Beijing (CN)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 16/890,454

(22) Filed: Jun. 2, 2020

(51) Int. Cl.
| | |
|---|---|
| A63F 13/44 | (2014.01) |
| H04L 43/0852 | (2022.01) |
| H04L 67/12 | (2022.01) |
| H04L 43/106 | (2022.01) |
| A63F 13/25 | (2014.01) |
| A63F 13/218 | (2014.01) |
| A63F 13/213 | (2014.01) |
| A63F 13/85 | (2014.01) |
| G06F 3/01 | (2006.01) |

(52) U.S. Cl.
CPC .......... *A63F 13/44* (2014.09); *A63F 13/213* (2014.09); *A63F 13/218* (2014.09); *A63F 13/25* (2014.09); *A63F 13/85* (2014.09); *G06F 3/01* (2013.01); *H04L 43/0852* (2013.01); *H04L 43/106* (2013.01); *H04L 67/12* (2013.01)

(58) Field of Classification Search
CPC .......... A63F 13/10; A63F 13/20; A63F 13/21; A63F 13/213; A63F 13/217; A63F 13/218; A63F 13/32; A63F 13/327; A63F 13/33; A63F 13/332; A63F 13/335; A63F 13/358; A63F 2300/10; A63F 2300/1056; A63F 2300/1087; A63F 2300/1093; A63F 2300/535; G06F 13/161; G06F 2212/1024; G11C 2207/2272; H04N 21/4384

See application file for complete search history.

(56) References Cited

U.S. PATENT DOCUMENTS

| | | | | |
|---|---|---|---|---|
| 2016/0180811 | A1* | 6/2016 | Colenbrander | G06T 7/90 345/207 |
| 2016/0294921 | A1* | 10/2016 | Meng | H04L 67/1095 |
| 2020/0301814 | A1* | 9/2020 | Phaneuf | A63F 13/355 |

* cited by examiner

*Primary Examiner* — Omkar A Deodhar
(74) *Attorney, Agent, or Firm* — Lee & Hayes, P.C.

(57) ABSTRACT

This disclosure describes, in part, techniques for determining a latency associated with a network application. For instance, an electronic device may receive first data from a first sensor, where the first data indicates that a control device received an input. The electronic device may also receive second data from a second sensor, where the second data indicates a change in content being output by a display device. The electronic device may then determine a first time associated with the control device receiving the input and a second time associated with the display device outputting the change in content. Additionally, the electronic device may determine the latency using the first time and the second time. The electronic device may then provide the latency to a user.

20 Claims, 10 Drawing Sheets

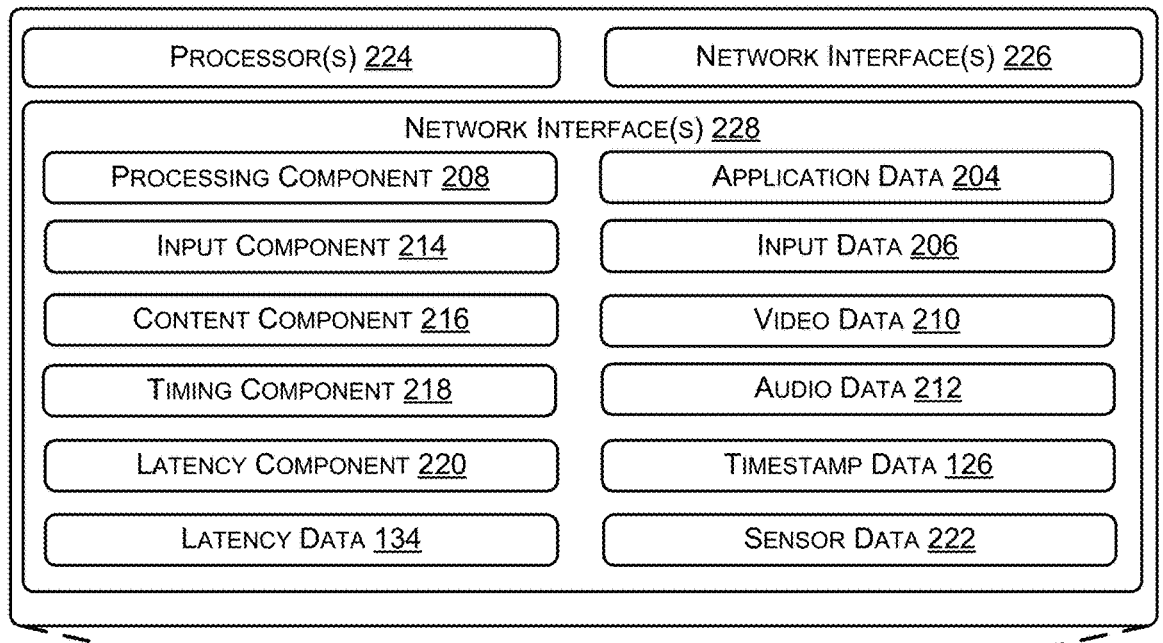
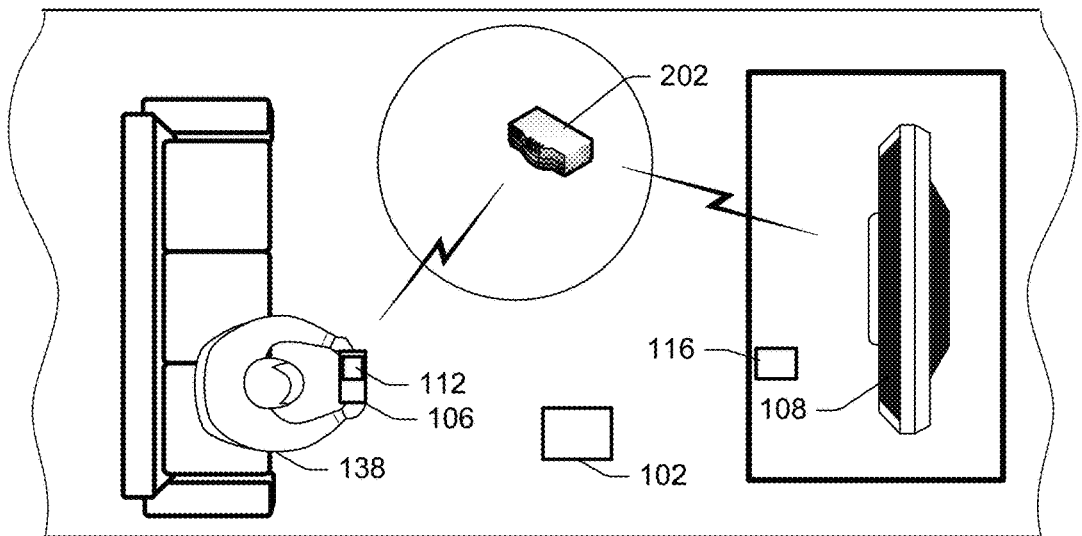
FIG. 2

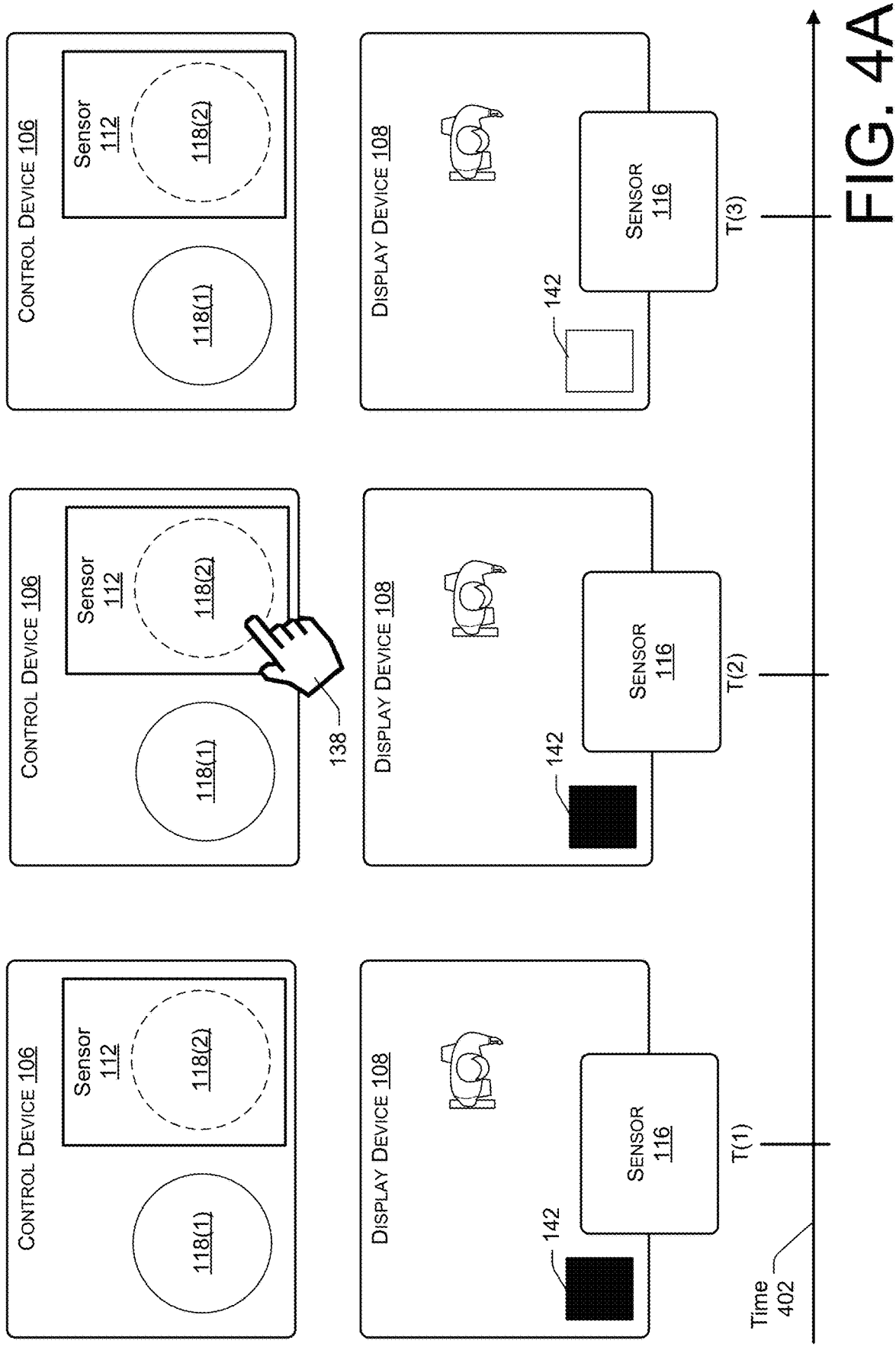

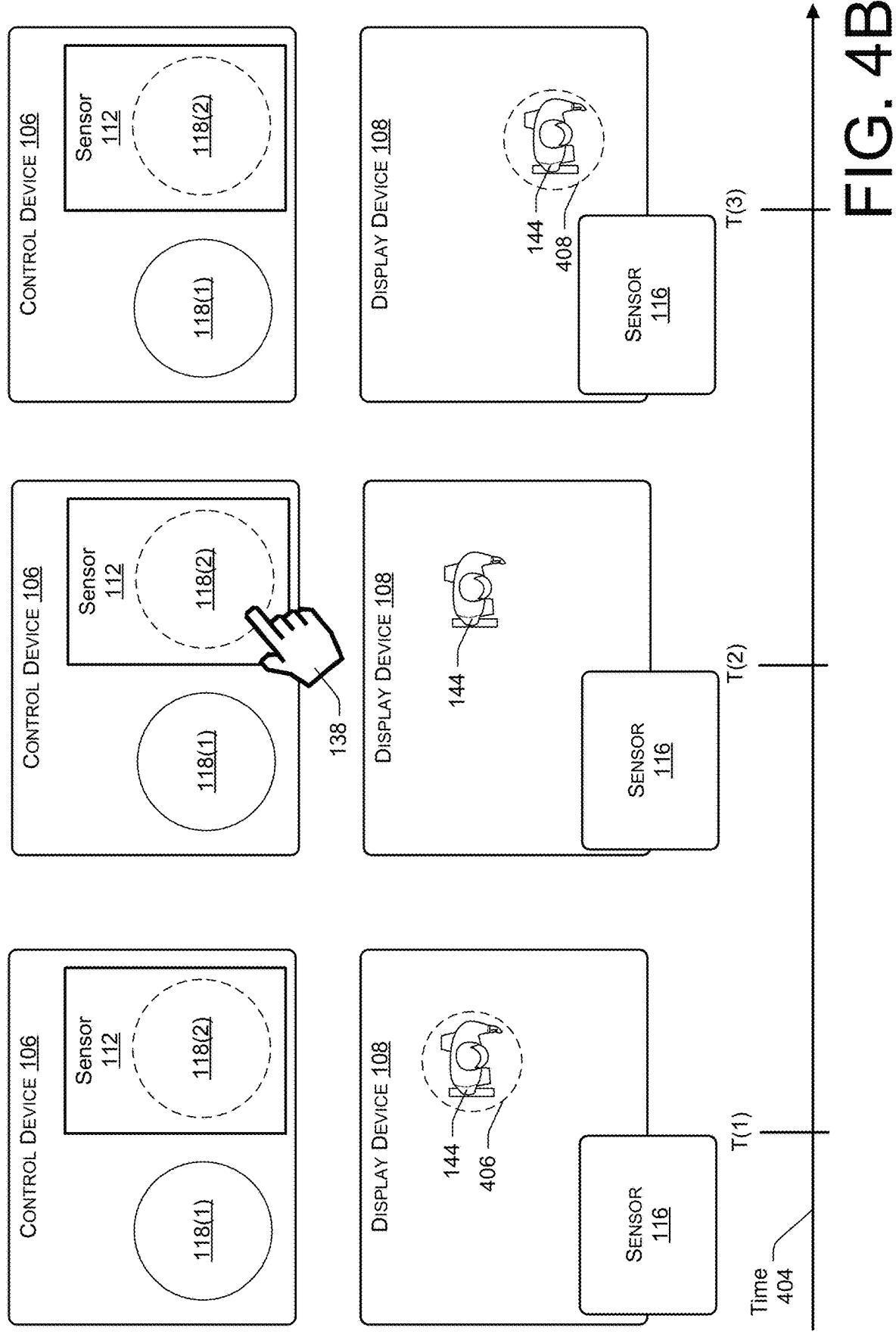

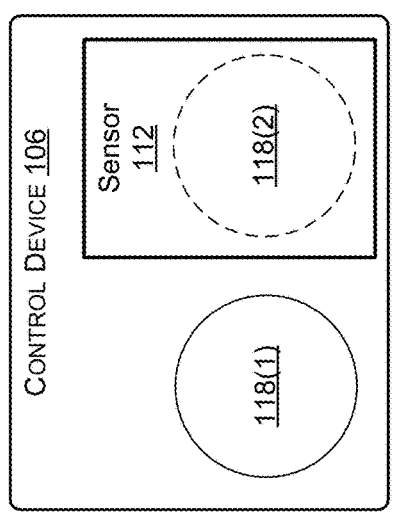
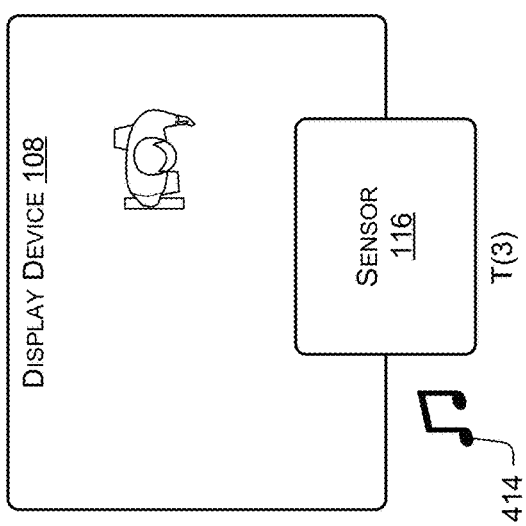
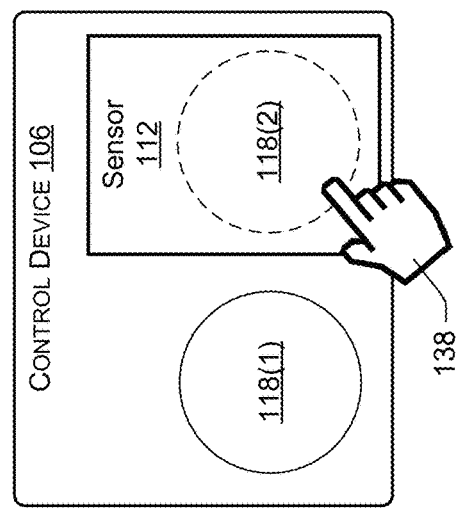
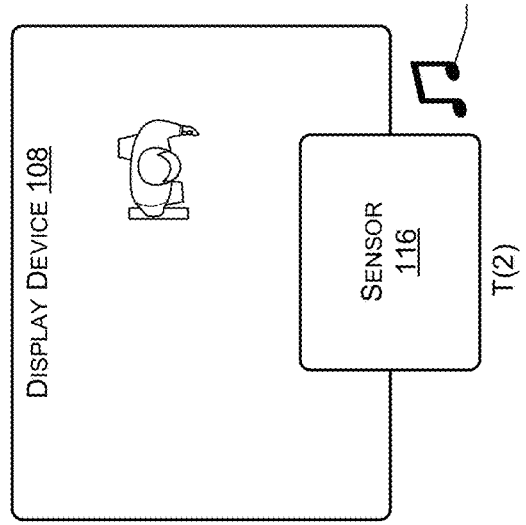
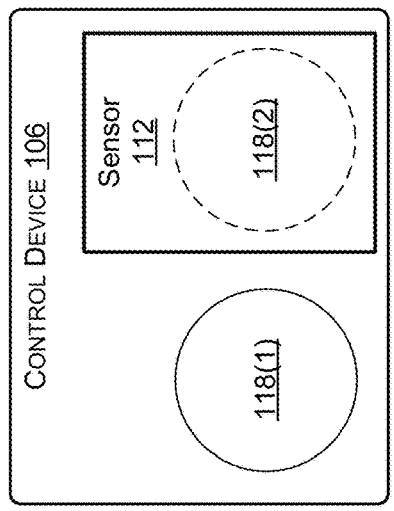
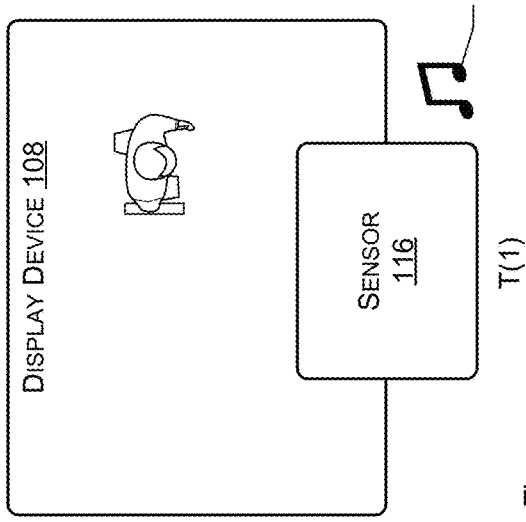
FIG. 4C

```
                                    600 ─┐

┌─────────────────────────────────────────────────────────────┐
    │  RECEIVE FIRST DATA FROM A PRESSURE SENSOR ASSOCIATED WITH A │
    │                      GAMING CONTROLLER                       │
    │                             602                              │
    └─────────────────────────────┬───────────────────────────────┘
                                  ▼
    ┌─────────────────────────────────────────────────────────────┐
    │  ANALYZE THE FIRST DATA TO DETERMINE THAT AN INPUT DEVICE    │
    │  OF THE GAMING CONTROLLER RECEIVED AN INPUT                  │
    │                             604                              │
    └─────────────────────────────┬───────────────────────────────┘
                                  ▼
    ┌─────────────────────────────────────────────────────────────┐
    │  GENERATE A FIRST TIMESTAMP REPRESENTING A FIRST TIME        │
    │  ASSOCIATED WITH THE INPUT DEVICE RECEIVING THE INPUT        │
    │                             606                              │
    └─────────────────────────────┬───────────────────────────────┘
                                  ▼
    ┌─────────────────────────────────────────────────────────────┐
    │           RECEIVE SECOND DATA FROM A LIGHT SENSOR            │
    │                             608                              │
    └─────────────────────────────┬───────────────────────────────┘
                                  ▼
    ┌─────────────────────────────────────────────────────────────┐
    │  ANALYZE THE SECOND DATA TO DETERMINE THAT THE LIGHT SENSOR  │
    │  DETECTED A CHANGE IN CONTENT ASSOCIATED WITH A DISPLAY      │
    │  DEVICE                                                      │
    │                             610                              │
    └─────────────────────────────┬───────────────────────────────┘
                                  ▼
    ┌─────────────────────────────────────────────────────────────┐
    │  GENERATE A SECOND TIMESTAMP REPRESENTING A SECOND TIME      │
    │  ASSOCIATED WITH THE LIGHT SENSOR DETECTING THE CHANGE IN    │
    │                          CONTENT                             │
    │                             612                              │
    └─────────────────────────────┬───────────────────────────────┘
                                  ▼
    ┌─────────────────────────────────────────────────────────────┐
    │  DETERMINE A LATENCY ASSOCIATED WITH A GAMING APPLICATION    │
    │  BASED AT LEAST IN PART ON THE FIRST TIME AND THE SECOND     │
    │  TIME                                                        │
    │                             614                              │
    └─────────────────────────────┬───────────────────────────────┘
                                  ▼
    ┌─────────────────────────────────────────────────────────────┐
    │       CAUSE AN INDICATION OF THE LATENCY TO BE PRESENTED     │
    │                             616                              │
    └─────────────────────────────────────────────────────────────┘
```

FIG. 6

TECHNIQUES FOR DETERMINING
NETWORK LATENCY

BACKGROUND

As gaming has become popular, companies have created electronic devices, such as videogame consoles, that allow users to play various types of games. For example, multiplayer online games may allow a user to play games with other users via a network connection. As the user provides inputs to a multiplayer online game via a gaming controller, a videogame console may send data to servers so that the servers can update a gaming environment associated with the multiplayer online game. Additionally, the videogame console may receive data from the servers that represents the current state of the gaming environment. The videogame console may then use the data to present the current state of the gaming environment to the user via a display device. As such, to ensure the best quality gaming experience, it may be important to know the latency when playing the multiplayer online game.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates a schematic diagram of an example system for providing a network application, according to various examples of the present disclosure.

FIGS. 4A-4C illustrates examples of determining latencies associated with a network application using two sensors, according to various examples of the present disclosure.

FIG. 6 illustrates an example process for determining a latency associated with a gaming application using a pressure sensor and a light sensor, according to various examples of the present disclosure.

DETAILED DESCRIPTION

Figure 1A:
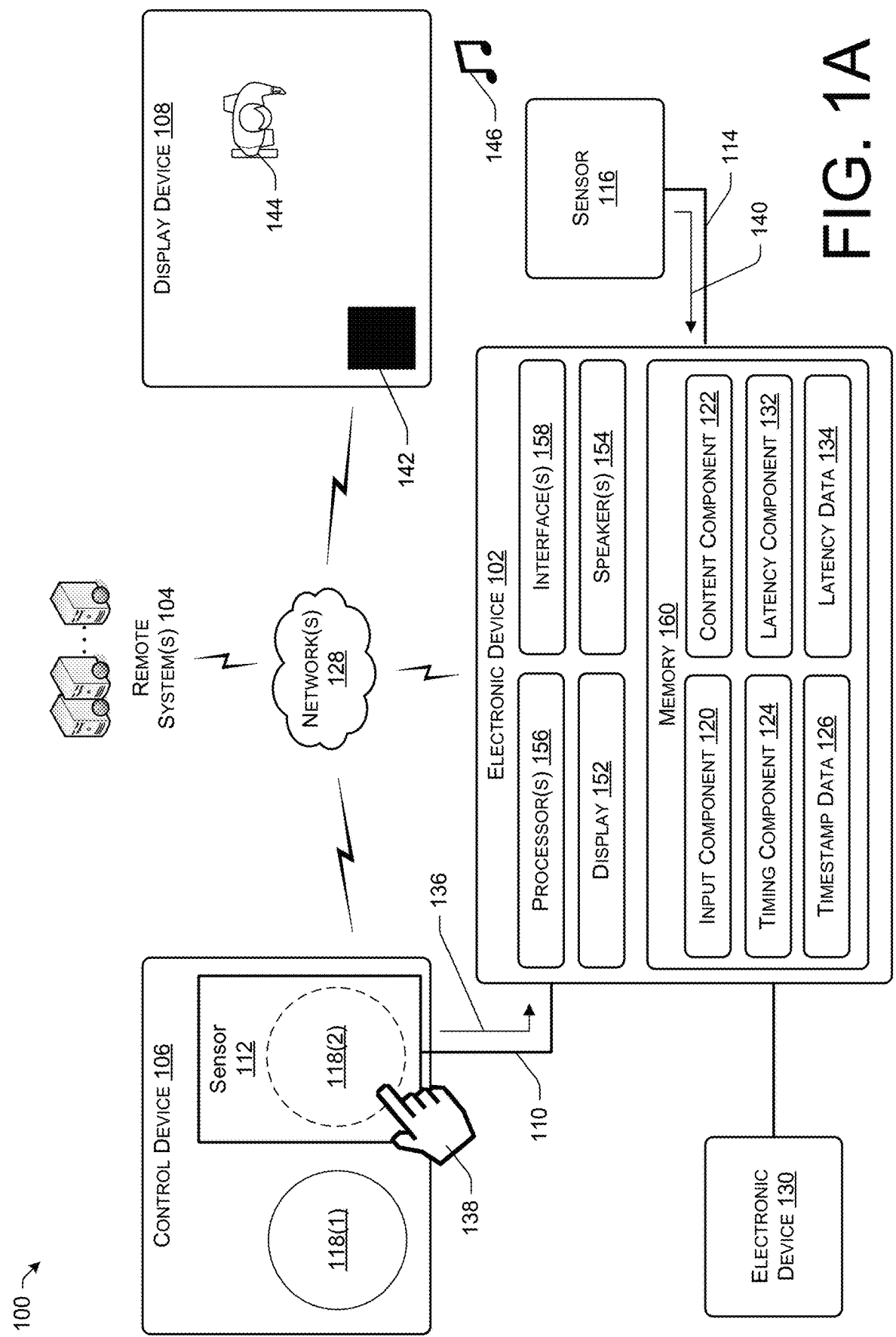
FIGS. 1A-1B illustrate an example system for determining a latency associated with a network application, according to various examples of the present disclosure.

This disclosure describes, in part, systems and methods for determining latencies associated with network applications. In some instances, an electronic device may use a first sensor, such as a pressure sensor, to detect an input to a control device. The electronic device may then determine a first time that the input was received by the control device and/or data representing the input was received from the first sensor. Additionally, the electronic device may use a second sensor, such as a light sensor and/or microphone(s), to detect a change in content being output by a display device. The electronic device may then determine a second time that the change in content was output by the display device and/or second data representing the change in content was received from the second sensor. The electronic device may then use the first time and the second time to determine the latency for a network application. For example, the electronic device may determine the latency as the difference between the second time and the first time. The electronic device may then provide an indication of the latency to a user.

For more details, and using an example where the network application is a network gaming application, a user may be using a gaming controller to control the gaming application being executed by remote system(s). To control the gaming application, the gaming controller may receive inputs using one or more input devices. The gaming controller may then send, via network(s), input data representing the inputs to the remote system(s). The remote system(s) may use the input data to update the current state of the gaming application. After updating the current state of the gaming application, the remote system(s) may send, via the network(s), video data and/or audio data representing the current state of the gaming application to a display device, such as a television. The display device may then use the video data to present images and/or use the audio data to output sound representing the current state of the gaming application.

As such, it may be important for the user to know the latency associated with the gaming application. As described herein, the latency may be associated with the time difference between when an input is received by the gaming controller and when the change in content is output by the display device, where the change in content is associated with the input. For example, if the input is associated with causing a character to move forward within the gaming environment, the latency may be associated with the time difference between the time that the gaming controller receives the input to move the character forward within the gaming environment and the time that the display device presents the character moving forward within the gaming environment. The latency may be caused by the time it takes for the gaming controller to detect the input, the time it takes for the gaming controller to send the input data to the remote system(s), the time it takes for the remote system(s) to update the gaming environment, the time it takes for the remote system(s) to send the video data and/or audio data to the display device, and/or the time it takes for the display device to output the content.

To determine the latency, an electronic device may use a first sensor that detects inputs to at least one input device of the gaming controller and a second sensor that detects changes in content being output by the display device. In some instances, the first sensor includes a pressure sensor that is placed over the at least one input device of the gaming controller. Additionally, or alternatively, in some instances, the first sensor includes a sensor that is located within the gaming controller and is capable of detecting the inputs to the at least one input device. As described herein, an input device may include, but is not limited to, a button, a joystick, a key, a touch-sensitive pad, a sensor, and/or any other device that is capable of receiving input.

In some instances, the second sensor includes a light sensor that detects the brightness of light being presented by at least a portion the display device. In some instances, the second sensor includes microphone(s) that generate audio data representing sound being output by the display device. Still, in some instances, the second sensor includes a camera and/or other type of imaging device that generates image data representing the content being presented by the display device.

To detect an input using the first sensor, the electronic device receives data (referred to as "first data" in these examples) from the first sensor. In some instances, the electronic device receives the first data by polling the first sensor at a given frequency (e.g., 50 Hertz, 100 Hertz, 150 Hertz, etc.). The electronic device may then analyze the first data to determine that an input device received an input. For a first example, if the first sensor includes a pressure sensor, the electronic device may analyze the first data to determine when a resistance and/or capacitance change represented by the first data satisfies (e.g., is equal to or greater than) a threshold resistance. For a second example, and again if the first sensor includes a pressure sensor, the electronic device may analyze the first data using a algorithm that is configured to detect when the input device received the input. Additionally to, or alternatively from polling the first sensor, in some instances, the electronic device receives the first data when the first sensor detects the input. For example, after detecting the input, the first sensor may generate the first data representing the detection of the input and send the first data to the electronic device. Additionally, in such instances, the first data may represent the first time at which the first sensor detected the first input.

To detect the change in content using the second sensor, the electronic device receives data (referred to as "second data" in these examples) from the second sensor. In some instances, the electronic device receives the second data by polling the second sensor for the second data at a given frequency (e.g., 50 Hertz, 100 Hertz, 150 hertz, etc.). The electronic device then analyzes the second data to determine that the display device output the change in content. For a first example, if the second sensor is a light sensor, the electronic device may analyze the second data to determine that a brightness of light being displayed by at least a portion of the display device switches from a first brightness to a second, different brightness. For a second example, if the second sensor is a microphone, the electronic device may analyze the second data to determine that sound represented by the second data switches from a first sound to a second, different sound (and/or a specific sound associated with the input). Still, for a third example, if the second sensor is an imaging device, the electronic device may analyze the second data to determine that the images represented by the second data depict an action occurring that is associated with the input.

Additionally to, or alternatively from polling the second sensor, in some instances, the electronic device receives the second data when the second sensor detects the change in content. For a first example, if the second sensor is a light sensor, the light sensor may detect that a brightness of light being displayed by at least a portion of the display device switches from a first brightness to a second, different brightness. For a second example, if the second sensor is a microphone, the microphone may detect that sound being output by the display device switches from a first sound to a second, different sound (and/or a specific sound associated with the input). Still, for a third example, if the second sensor is an imaging device, the imaging device may detect that the display device is displaying an action that is associated with the input. In either example, based on the detection, the second sensor may generate and then send the second data. Additionally, in such instances, the second data may represent the second time at which the second sensor detected the change in content.

The electronic device (and/or the remote system(s)) may initially receive the first data from the first sensor and use the first data to determine that the input device received the input (e.g., using the processes described above). Based on determining that the input occurred, the electronic device may generate a first timestamp indicating a first time that the first data was received from the first sensor and/or a first time that the first sensor detected the input. In some instances, the electronic device may then store first timestamp data representing the first timestamp. Additionally, in some instances, the electronic device may send the first timestamp data to one or more other devices (e.g., the remote system(s)).

Next, the electronic device may receive the second data from the second sensor and use the second data to determine that the change in content occurred (e.g., using the processes described above). Based on determining that the change in content occurred, the electronic device may generate a second timestamp indicating a second time that the second data was received from the second sensor and/or a second time that the second sensor detected the change in content. In some instances, the electronic device may then store second timestamp data representing the second timestamp. Additionally, in some instances, the electronic device may send the second timestamp data to the one or more other devices.

The electronic device (and/or the remote system(s)) may then determine the latency associated with the gaming application. For example, the electronic device may determine the latency as the difference between the second time represented by the second timestamp and the first time represented by the first timestamp. In some instances, the electronic device may continue to receive first data from the first sensor and/or second data from the second sensor. The electronic device may then continue to perform similar processes as those described above to determine latencies associated with the gaming application. Still, in some instances, the electronic device may determine an average latency and/or an average latency over a given time period using the determined latencies. As described herein, the given period of time may include, but is not limited to, five seconds, ten seconds, thirty seconds, one minute, and/or any other time period.

For example, the electronic device may determine the average latency over a five minute period of time. To determine the average latency, the electronic device may perform the processes described above to determine one or more latencies within the five minute period of time. The electronic device may then take the average of the one or more latencies to determine the average latency over the five minute period of time.

The electronic device (and/or the remote system(s)) may then cause an indication of the latency to be provided to the user. For a first example, the electronic device may include a display that displays the indication of the latency to the user. For a second example, the electronic device (and/or the remote system(s)) may send data to the display device, where the data represents the latency. The display device may then use the data to display the indication of the latency to the user. Still, for a third example, the electronic device (and/or the remote system(s)) may send data to another device, where the data represents the latency. The other device may then use the data to display the indication of the latency to the user.

While the above examples describe determining the latency for a gaming application that is being controlled by a gaming controller, in other examples, similar processes may be performed to determine the latency for other types of network applications using other types of control devices. As described herein, a network application may include, but is not limited to, a gaming application, a word processing application, an educational application, a multimedia application (e.g., movie, music, etc.), and/or any other type of application that is capable of being accessed via the network(s). In some instances, the network application may include functionality that allows the latency to be determined. For example, the network application may include functionality to present specific content and/or output specific sound when a specific input is received by the control device 106.

Additionally, as described herein, a control device may include, but is not limited to, a gaming controller, a keyboard, a mouse, a mobile phone, a computer, a laptop, and/or any other device that includes one or more input devices.

The above examples may provide advantages over previous processes for determining latency. For a first example, since the electronic device is receiving the data from sensors and then using the data to detect events (e.g., inputs, changes in content, etc.), there may be no need to synchronize clocks between different devices. For a second example, since the first sensor can be placed on different control devices, the system may be used to determine the latencies for many different types of control devices. This may allow users, such as gamers, to determine the latencies associated with different types of gaming controllers and select the gaming controller that provides the least amount of latency.

As described herein, a pressure sensor may include, but is not limited to, an absolute pressure sensor, a gauge pressure sensor, a differential pressure sensor, a sealed pressure sensor, a force collector type pressure sensor, and/or any other type of sensor that may be used to detect input to an input device. In some instances, the data output by the pressure sensor may indicate the amount of pressure that is being detected by the pressure sensor. Additionally, a light sensor may include, but is not limited to, a color sensor, an infra-red sensor, a contact image sensor, a light-emitting diode sensor, and/or any other type of sensor that may be used to detect light (e.g., both visible and non-visible light). In some instances, the data being output by the light sensor may indicate the brightness of light that is being detected by the light sensor.

Figure 1B:
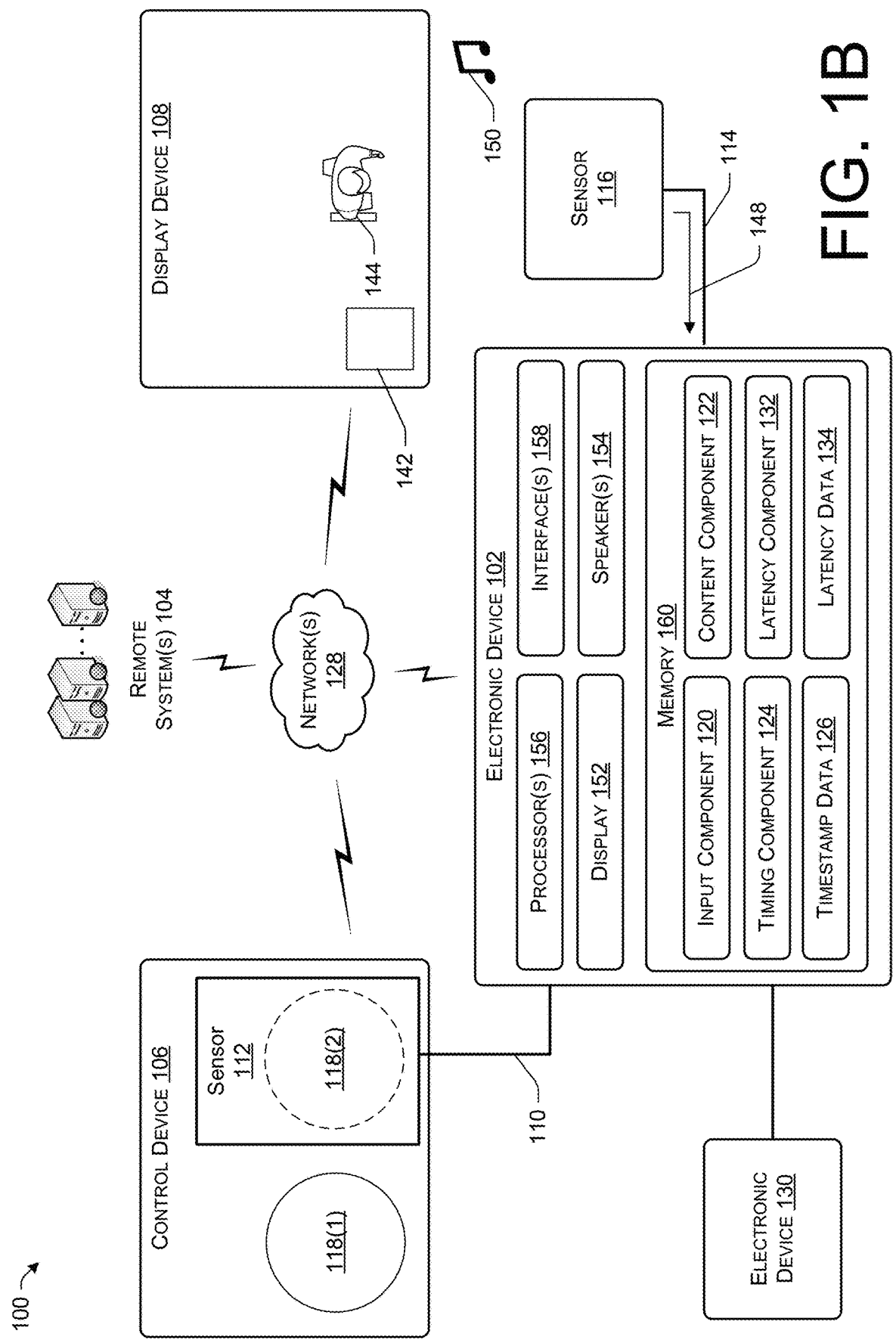

FIGS. 1A-1B illustrate an example system for determining a latency associated with a network application, according to various examples of the present disclosure. As shown, the system 100 may include, for example, an electronic device 102, remote system(s) 104, a control device 106, and a display device 108. In the example of FIGS. 1A-1B, the electronic device 102 may include a first wired connection 110 with a first sensor 112 and a second wired connection 114 with a second sensor 116. However, in other examples, the electronic device 102 may include a first wireless connection with the first sensor 112 and/or a second wireless connection the second sensor 116.

The first sensor 112 may include a pressure sensor that is placed on at least one of the input devices 118(1)-(2) of the control device 106. For instance, and in the example of FIGS. 1A-1B, the first sensor 112 is placed on the input device 118(2). If the first sensor 112 includes a pressure sensor, the first sensor 112 may be configured to detect a change in resistance as pressure is applied to the input device 118(2). For example, as the pressure is applied to the input device 118(2), the resistance detected by the first sensor 112 may increase. The first sensor 112 may then send, to the electronic device 102 and via the first wired connection 110, first data representing the resistance. In some instances, the first sensor 112 sends the first data to the electronic device 102 based on the electronic device 102 polling the first sensor 112 for the first data at a given frequency. Additionally, or alternatively, in some instances, the first sensor 112 sends the first data to the electronic device 102 based on the first sensor 112 detecting the input to the input device 118(2) (e.g., using similar processes as the electronic device 102).

The electronic device 102 may store an input component 120 that analyzes the first data to determine when the input device 118(2) receives the input. For a first example, and when the first data represents the resistance, the input component 120 may use one or more algorithms that indicate that the input device 118(2) receives the input when the resistance represented by the first data is equal to or greater than a threshold resistance. For a second example, and when the first data indicates that the first sensor 112 detected the input, the input component 120 may analyze the first data to determine that the first data indicates that the first sensor 112 detected the input.

In some instances, the second sensor 116 includes a light sensor that detects a brightness of light being displayed by at least a portion of the display of the display device 108. In some instances, the second sensor 116 includes microphone(s) that detects sound being output by speaker(s) of the display device 108. Still, in some instances, the second sensor 116 includes an imaging device that captures images of content being displayed by the display device 108. In any of the instances, the second sensor 116 may then send, to the electronic device 102 and via the second wired connection 114, second data representing the content being output by the display device 108 (e.g., the light, the sound, the images, etc.). In some instances, the second sensor 116 sends the second data to the electronic device 102 based on the electronic device 102 polling the second sensor 116 for the second data at a given frequency. Additionally, or alternatively, in some instances, the second sensor 116 sends the second data to the electronic device 102 based on the second sensor 116 detecting the change in content (e.g., using similar processes as the electronic device 102).

The electronic device 102 may store a content component 122 that analyzes the second data to determine when the change in content occurs at the display device 108. For a first example, and when the second sensor 116 includes a light sensor, the content component 122 may analyze the second data to determine when the brightness changes within the at least the portion of the display. For a second example, and when the second sensor 116 includes microphone(s), the content component 122 may analyze the second data to determine when the sound being output by the display device 108 changes and/or includes a specific type of sound that is associated with the received input. Still, for a third example, and when the second sensor 116 includes an imaging device, the content component 122 may analyze the second data to determine when images represented by the second data depict an action occurring that is associated with the input. Each of these examples are described in more detail with regard to FIGS. 4A-4C.

The electronic device 102 may also store a timing component 124 that is configured to generate timestamps. For a first example, the timing component 124 may generate timestamps representing times that the input device 118(2) receives the inputs. For a second example, the timing component 124 may generate timestamps representing times that the changes in content occurred at the display device 108. The timing component 124 may also generate and then store timestamp data 126 representing the timestamps. In some instances, the electronic device 102 may send, via network(s) 128, the timestamp data 126 to the remote system(s) 104 and/or another electronic device 130.

The electronic device 102 may also store a latency component 132 that is configured to determine latencies associated with network applications. In some instances, the latency component 132 may determine the latencies based at least in part on the timestamps representing the times that the input device 118(2) received the inputs and the timestamps representing the times that the changes in content occurred at the display device 108. For example, the latency component 132 may determine a latency by taking the difference between a time at which the input device 118(2) received an input and a time at which a change in content associated with the input occurred at the display device 108. In some instances, the latency component 132 may also be configured to determine an average latency and/or an average latency over a period of time associated with the network application. The latency component 132 may also generate and then store latency data 134 representing the latencies.

In the example of FIG. 1A, and at a first time, the electronic device 102 may receive, via the first wired connection 110, first data 136 from the first sensor 112. The input component 120 may analyze the first data 136 and determine, based on the analysis, that the input device 118(2) received an input from a user 138. For example, the input component 120 may analyze the first data 136 to determine that the first data 136 represents a resistance that satisfies a threshold resistance. The timing component 124 may then generate a timestamp indicating a time that the input device 118(2) received the input and/or a time that the electronic device 102 received the first data 136. Additionally, the timing component 124 may store timestamp data 126 representing the timestamp.

Additionally, in the example of FIG. 1A, and at the first time, the electronic device 102 may receive, via the second wired connection 114, second data 140 from the second sensor 116. The content component 122 may analyze the second data 140 to determine the content that is being output by the display device 108. For a first example, the content component 122 may analyze the second data 140 to determine a first brightness associated with a portion 142 of the display of the display device 108. For a second example, the content component 122 may analyze the second data 140 to determine a first state of images being presented by the display device 108 (e.g., a character 144 is at a first location). Still, for a third example, the content component 122 may analyze the second data 140 to determine first sound 146 being output by the display device 108.

As shown in the example of FIG. 1B, and at a second time, the electronic device 102 may receive, via the second wired connection 114, second data 148 from the second sensor 116. The content component 122 may analyze the second data 148 to determine the content that is being output by the display device 108. For a first example, the content component 122 may analyze the second data 148 to determine a second brightness associated with the portion 142 of the display of the display device 108. For a second example, the content component 122 may analyze the second data 148 to determine a second state of images being presented by the display device 108 (e.g., the character 144 is at a second location). Still, for a third example, the content component 122 may analyze the second data 148 to determine second sound 150 being output by the display device 108.

In some instances, the content component 122 may then detect the change in content associated with the display device 108. For a first example, the content component 122 may detect the change in content based on the brightness associated with the portion 142 of the display changing from the first brightness to the second brightness. For a second example, the content component 122 may detect the change in content based on the state of the images depicting an action associated with the input (e.g., the character 144 moving to a new location). Still, for a third example, the content component 122 may detect the change in content based on the second sound 150 that is being output by the display device 108. For example, the second sound 150 may be associated with the input that was received by the input device 118(2).

In some instances, the content component 122 may determine that the change in content is associated with the input that was received by the control device 106. For a first example, the network application may be configured such that the portion 142 of the display is to switch from a first brightness to a second, different brightness when the input device 118(2) receives an input. In such an example, the content component 122 may determine that both the input device 118(2) received the input and the brightness within the portion 142 of the display switches from the first brightness to the second brightness. As such, the content component 122 may determine that the change in content is associated with the input received by the control device 106.

For a second example, the network application may be configured such that the input device 118(2) causes the character 144 to move in a downwards direction when receiving input. In such an example, the content component 122 may determine that both the input device 118(2) received the input and that the change in content includes the character 144 moving in the downwards direction. As such, the content component 122 may determine that the change in content is associated with the input received by the control device 106.

For a third example, the network application may be configured such that the input device 118(2) causes the second sound 150 to be output when receiving input. In such an example, the content component 122 may determine that both the input device 118(2) received the input and that the second sound 150 was output by the display device 108. As such, the content component 122 may determine that the change in content is associated with the input received by the control device 106.

The timing component 124 may then generate a timestamp indicating a time that the display device 108 output the change in content and/or a time that the electronic device 102 received the second data 148. Additionally, the timing component 124 may store timestamp data 126 representing the timestamp. The latency component 132 may then determine the latency associated with the network application based on the time that the input device 118(2) received the input and the time that the display device 108 output the change in content. For example, the latency component 132 may determine the latency as the difference between the times. The latency component 132 may then store latency data 132 representing the latency.

In some instances, the electronic device 102 may continue to perform the processes described above to determine one or more additional latencies associated with the network application. Additionally, in some instances, the electronic device 102 may determine an average latency and/or an average latency over a period of time using the determined latencies. The electronic device 102 may then provide the latency to the user 138. For a first example, the electronic device 102 may use a display 152 to present an indication of the latency to the user 138. For a second example, the electronic device 102 may use speaker(s) 154 to output sound indicating the latency to the user 138.

For a third example, the electronic device 102 may send the latency data 134 to the display device 108. The display device 108 may then use the latency data 134 to present an indication of the latency to the user 138. Still, for a fourth example, the electronic device 102 may send the latency data 134 to the electronic device 130. The electronic device 130 may then use the latency data 132 to present an indication of the latency to the user 138. The electronic device 130 may include, but is not limited to, a computer, a laptop, a mobile phone, a tablet, and/or any other type of device.

Although the example of FIGS. 1A-1B illustrate the electronic device 102 as being separate from the control device 106, in other examples, one or more components of the electronic device 102 may be included in the control device 106. For example, the control device 106 may include the first sensor 112 and the second sensor 116. The control device 106 may then be able to perform the processes described herein, with respect to the electronic device 102, to determine the latency.

In the example of FIGS. 1A-1B, the electronic device 102 further includes processor(s) 156, network interface(s) 158, and memory 160. As used herein, a processor, such as the processor(s) 156, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more systems.

Memory, such as the memory 160, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s), such as the network interface(s) 158, may enable data to be sent between devices. For example, the network interface(s) 158 may enable data to be sent between the electronic device 102, the remote system(s) 104, the control device 106, the display device 108, and/or with one or more other remote systems, as well as other networked devices. The network interface(s) may include one or more network interface controllers (NICs) or other types of transceiver devices to send and receive messages over the network(s) 128.

For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

FIG. 2 illustrates a schematic diagram of an example system for providing a network application, according to various examples of the present disclosure. The system 200 may include, for example, the electronic device 102, the remote system(s) 104, the control device 106, the display device 108, and a network device 202 (e.g., an access point). In the example of FIG. 2, the control device 106 may communicate with the remote system(s) 104 via the network device 202. For instance, the control device 106 may send data to the network device 202, which may then send the data to the remote system(s) 104 via the network(s) 128. Additionally, the remote system(s) 104 may send data to the network device 202 via the network(s) 128, which may then send the data to the control device 106. Furthermore, the remote system(s) 104 may communicate with the display device 108 via the network device 202. For instance, the remote system(s) 104 may send data to the network device 202 via the network(s) 128, which may then send the data to the display device 108.

In some instances, the remote system(s) 104 may store application data 204 representing one or more applications that are accessible by the control device 106 via the network(s) 128. An application may include, but is not limited to, a gaming application, a word processing application, an educational application, a multimedia application (e.g., movie, music, etc.), and/or any other type of application that is capable of being accessed via the network(s) 128. While accessing an application, the control device 106 may receive inputs from the user 138. The control device 106 may then send, to the remote system(s) 104, input data 206 representing the inputs. The remote system(s) 104 may then use a processing component 208 to update a current state of the application based on the input data 206.

The remote system(s) 104 may then send, to the network device 202, data representing the current state of the application. The data may include, but is not limited to, video data 210 representing image(s) of the current state of the application and/or audio data 212 representing sound corresponding to the current state of the application. In some instances, the remote system(s) 104 send, to the network device 202, a data packet that includes the video data 210 and/or the audio data 212. In other instances, the remote system(s) 104 may separately send, to the network device 202, the video data 210 from the audio data 212.

The network device 202 may then send the video data 210 and the audio data 212 to the display device 108. In some instance, the network device 202 may send a data packet that includes the video data 210 and the audio data 212. In other instances, the network device 202 may separately send the video data 210 from the audio data 212. In either instance, using the video data 210, the display device 108 may display image(s) representing the current state of the application. For example, if the application includes a gaming application, the display device 108 may display content representing a current state of the game. In the example of FIG. 2, the current state of the game may include an object (e.g., a character) located at a position in a gaming environment (e.g., a forest). In some instances, the display device 108 may further output the sound represented by the audio data 212.

The network device 202 may further send the video data 210 and/or the audio data 212 to the control device 106. In some instance, the network device 202 may send a data packet that includes the video data 210 and the audio data 212. In other instances, the network device 202 may separately send the video data 210 from the audio data 212. In either instance, control device 106 may then output the sound represented by the audio data 212.

Next, the user 138 can then use the control device 106 to provide inputs to the network application. For instance, the control device 106 may receive an input, such as a selection of a button, joystick, key, touch-sensitive pad, sensor, and/or the like associated with the control device 106. The control device 106 may then send, to the remote system(s) 104 via the network device 202, the input data 206 representing the input. Using the input data 206, the processing component 208 may update the state of the network application. For example, and using the example above where the network application includes the gaming application, the input may be associated with moving the object forward by a given amount within the gaming environment. As such, the processing component 208 may analyze the input data 206 to determine that the input includes moving the object forward by the given amount. The processing component 208 may then update the state of the of the gaming application by moving the object forward in the gaming environment by the given amount.

The remote system(s) 104 may then send, to the network device 202, additional video data 210 and/or additional audio data 212 representing the new state of the network application. The network device 202 may then send the additional video data 210 and/or the additional audio data 212 to the display device 108 and/or the control device 106. Similar to the techniques described above, the display device 108 may then display image(s) represented by the additional video data 210 while the control device 106 is outputting the sound represented by the additional audio data 212.

In some instances, the remote system(s) 104 may continue to receive the input data 206 from the control device 106 via the network device 202. The processing component 208 may then continue to process the input data 206 in order to update the state of the application. Based at least in part on the updating, the remote system(s) 104 may continue to send, to the network device 202, the video data 210 and/or the audio data 212 representing the current state of the application. Additionally, the network device 202 may continue to send the video data 210 and/or the audio data 212 to the display device 108 and/or the control device 106. Using the data, the control device 106 may continue to synchronize the outputting of the sound with the displaying of the content by the display device 108.

As further illustrated in the example of FIG. 2, the remote system(s) 104 may store an input component 214, a content component 216, a timing component 218, and a latency component 220. In some instances, the remote system(s) 104 may use the input component 214, the content component 216, the timing component 218, and/or the latency component 220 to perform similar processes as those described above with respect to the electronic device 102. For example, the remote system(s) 104 may receive sensor data 222 generated by the first sensor 112 and/or the second sensor 116. The remote system(s) 104 may receive the sensor data 222 from the electronic device 102, the control device 106, the display device 108, the first sensor 112, the second sensor 116, and/or one or more other devices.

The input component 214 may then analyze the sensor data 222 to determine when the input devices associated with the control device 106 receive inputs. Additionally, the content component 216 may analyze the sensor data 222 to determine when there is a change in content being output by the display device 108. The timing component 218 may be configured to generate the timestamps representing the times that the input devices receive the inputs and/or the times that the changes to content occurred with the display device 108. Also, the latency component 220 may be configured to determine the latencies associated with a network application using the timestamps, using similar processes as the latency component 132 described above. The remote system(s) 104 may then send latency data 134 representing the latencies to the electronic device 102, the control device 106, the display device 108, and/or one or more other devices for output to the user 138.

As further illustrated in the example of FIG. 2, the remote system(s) 104 may include processor(s) 224, network interface(s) 226, and memory 228.

Figure 3:
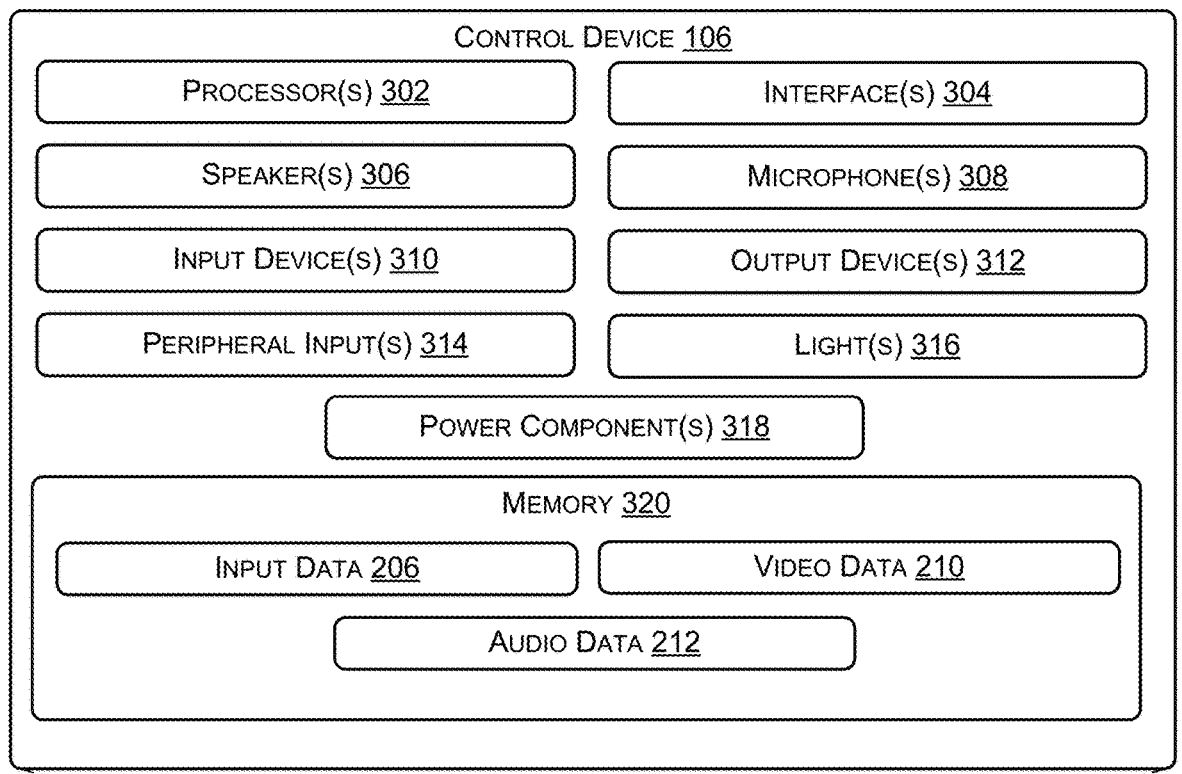
FIG. 3 illustrates a block diagram of an example architecture of a control device, according to various examples of the present disclosure.

FIG. 3 illustrates a block diagram of an example architecture of the control device 106, according to various examples of the present disclosure. As shown, the control device 106 includes processor(s) 302, network interface(s) 304, speakers 306, microphone(s) 308, input device(s) 310, output device(s) 312, peripheral input(s) 314, light(s) 316, power component(s) 318, and memory 320. In some instances, the control device 106 may include one or more additional components no illustrated in the example of FIG. 3. In some instances, the control device 106 may not include one or more of the speaker(s) 306, the microphone(s) 308, the input device(s) 310, the output device(s) 312, the peripheral input(s) 314, or the light(s) 416.

Although the control device 106 is illustrated as having one or more integral speaker(s) 306, in other examples, the control device 106 may not include speaker(s) 306. For example, the control device 106 may produce an audio output signal that drives an external loudspeaker, such as headphones connected to the control device 106 via a peripheral input 314. As another example, the control device 106 may drive or control an external loudspeaker through a wireless data connection such as a Bluetooth connection. In other situations, the control device 106 may be used in conjunction with a loudspeaker device that receives audio data and other instructions from the remote system(s) 104, rather than from the control device 106.

The microphone(s) 308 may include sensors (e.g., transducers) configured to receive sound. The microphone(s) 308 may generate input signals for audio input (e.g., sound). For example, the microphone(s) 308 may determine digital input signals for an utterance of a user. In some instances, the microphone(s) 308 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 3113) to receive sound from four directions. The microphone(s) 308 may be in a planar configuration, or positioned apart in a non-planar three-dimensional region. In some instances, the microphone(s) 308 may include a spatially disparate array of sensors in data communication. For example, a networked array of sensors may be included. The microphone(s) 308 may include omni-directional microphones, directional microphones (e.g., shotgun microphones), and so on.

The input device(s) 310 (which may represent, and/or include, the input devices 118(1)-(2)) may include button(s), key(s), joystick(s), touch-sensitive pad(s), trigger(s), sensor(s) that detect movement of the control device 106 (e.g., accelerometer(s), magnetometer(s), etc.), and/or any other type of device that is able to receive input from the user. The output device(s) 312 may include devices that provide feedback to the user. For instance, the output device(s) 312 may include haptic driver(s) that cause actuator(s) to activate.

The power component(s) 318 may be configured to provide power to the control device 106. For a first example, the power component(s) 318 may include one or more batteries. In some instances, the one or more batteries may be rechargeable. For a second example, the power component(s) 318 may include components connected to a source of external AC (alternating-current) power, such as a household AC power supply (alternatively referred to herein as "AC mains" or "wall power").

The light(s) 316 may include visual indicator(s) (e.g., light-emitting diodes (LEDs)) that emit light when activated by the control device 106. In some instances, the visual indicator(s) may include a light ring disposed on a portion of the control device 106. In other instances, the visual indicator(s) may be disposed on various portions on the control device 106. The peripheral input(s) 314 may include one or more components for connecting peripheral devices to the control device 106. For instance, a peripheral input 314 may include a jack for connecting headphones to the control device 106.

FIG. 4A illustrates a first example of determining a latency associated with a network application using two sensors, according to various examples of the present disclosure. As shown, over a period of time 402, various events occur with the control device 106 and the display device 108. For example, at a first time T(1), the control device 106 is not receiving input from the user 138. In some instances, at time T(1), the first sensor 112 may send data to the electronic device 102 (and/or the remote system(s) 104) that indicates that the input device 118(2) of the control device 106 is not receiving an input. Additionally, at time T(1), the display device 108 is displaying a first brightness at the portion 142 of the display. In some instances, at time T(1), the second sensor 116 may send data to the electronic device 102 (and/or the remote system(s) 104) that indicates the first brightness of the portion 142 of the display.

Next, at a second time T(2), the control device 106 is receiving input from the user 138. As such, and at time T(2), the first sensor 112 may send data to the electronic device 102 (and/or the remote system(s) 104) that indicates that the input device 118(2) of the control device 106 is receiving the input. Additionally, at time T(2), the display device 108 is still displaying the first brightness at the portion 142 of the display. In some instances, at time T(2), the second sensor 116 may send data to the electronic device 102 (and/or the remote system(s) 104) that indicates the first brightness of the portion 142 of the display.

Finally, at a third time T(3), the control device 106 is again not receiving input from the user 138. In some instances, at time T(3), the first sensor 112 may send data to the electronic device 102 (and/or the remote system(s) 104) that indicates that the input device 118(2) of the control device 106 is not receiving an input. Additionally, at time T(3), the display device 108 is displaying a second brightness at the portion 142 of the display. As such, at time T(3), the second sensor 116 may send data to the electronic device 102 (and/or the remote system(s) 104) that indicates the second brightness of the portion 142 of the display.

The electronic device 102 (and/or the remote system(s) 104) may analyze the data received from the first sensor 112 and the data received from the second sensor 116 to determine that the input was received at time T(2) and the change in content occurred at time T(3). In some instances, the electronic device 102 (and/or the remote system(s) 104) may then determine the latency as the difference in time between time T(2) and time T(3).

Although the example of FIG. 4A illustrates the second sensor 116 as detecting visible light, in other examples, the second sensor 116 may be configured to detect non-visible light. For example, the second sensor 116 may include an infra-red sensor (and/or other type of sensor) that is capable to detecting non-visible light that is output by the display device 108. This way, the change in content cannot be detect by the user controlling the network application.

FIG. 4B illustrates a second example of determining a latency associated with a network application using two sensors, according to various examples of the present disclosure. As shown, over a period of time 404, various events occur with the control device 106 and the display device 108. For example, at a first time T(1), the control device 106 is not receiving input from the user 138. In some instances, at time T(1), the first sensor 112 may send data to the electronic device 102 (and/or the remote system(s) 104) that indicates that the input device 118(2) of the control device 106 is not receiving an input. Additionally, at time T(1), the display device 108 is displaying a character 144 located at a first location 406. In some instances, at time T(1), the second sensor 116 may send data (e.g., image data) to the electronic device 102 (and/or the remote system(s) 104) that indicates the character 144 is at the first location 406.

Next, at a second time T(2), the control device 106 is receiving input from the user 138. As such, and at time T(2), the first sensor 112 may send data to the electronic device 102 (and/or the remote system(s) 104) that indicates that the input device 118(2) of the control device 106 is receiving the input. Additionally, at time T(2), the display device 108 is still displaying the character 144 at the first location 406. In some instances, at time T(2), the second sensor 116 may send data (e.g., image data) to the electronic device 102 (and/or the remote system(s) 104) that indicates the character 144 is at the first location 406.

Finally, at a third time T(3), the control device 106 is again not receiving input from the user 138. In some instances, at time T(3), the first sensor 112 may send data to the electronic device 102 (and/or the remote system(s) 104) that indicates that the input device 118(2) of the control device 106 is not receiving an input. Additionally, at time T(3), the display device 108 is displaying the character 144 at a second location 408. As such, at time T(3), the second sensor 116 may send data (e.g., image data) to the electronic device 102 (and/or the remote system(s) 104) that indicates the character 144 is at the second location 408.

The electronic device 102 (and/or the remote system(s) 104) may analyze the data received from the first sensor 112 and the data received from the second sensor 116 to determine that the input was received at time T(2) and the change in content occurred at time T(3). For example, and with regards to the data received from the second sensor 116, the electronic device 102 (and/or the remote system(s) 104) may analyze the image data to determine that the image data represents a first image depicting the character 144 located at the first location 406 followed by a second image depicting the character 144 located at the second location 408. In some instances, the electronic device 102 (and/or the remote system(s) 104) may then determine the latency as the difference in time between time T(2) and time T(3).

FIG. 4C illustrates a third example of determining a latency associated with a network application using two sensors, according to various examples of the present disclosure. As shown, over a period of time 410, various events occur with the control device 106 and the display device 108. For example, at a first time T(1), the control device 106 is not receiving input from the user 138. In some instances, at time T(1), the first sensor 112 may send data to the electronic device 102 (and/or the remote system(s) 104) that indicates that the input device 118(2) of the control device 106 is not receiving an input. Additionally, at time T(1), the display device 108 is outputting first sound 412. In some instances, at time T(1), the second sensor 116 may send data (e.g., audio data) to the electronic device 102 (and/or the remote system(s) 104) that represents the first sound 412.

Next, at a second time T(2), the control device 106 is receiving input from the user 138. As such, and at time T(2), the first sensor 112 may send data to the electronic device 102 (and/or the remote system(s) 104) that indicates that the input device 118(2) of the control device 106 is receiving the input. Additionally, at time T(2), the display device 108 is still outputting the first sound 412. In some instances, at time T(2), the second sensor 116 may send data (e.g., audio data) to the electronic device 102 (and/or the remote system(s) 104) that indicates the first sound 412.

Finally, at a third time T(3), the control device 106 is again not receiving input from the user 138. In some instances, at time T(3), the first sensor 112 may send data to the electronic device 102 (and/or the remote system(s) 104) that indicates that the input device 118(2) of the control device 106 is not receiving an input. Additionally, at time T(3), the display device 108 is outputting second sound 414. As such, at time T(3), the second sensor 116 may send data (e.g., audio data) to the electronic device 102 (and/or the remote system(s) 104) that indicates the second sound 414.

The electronic device 102 (and/or the remote system(s) 104) may analyze the data received from the first sensor 112 and the data received from the second sensor 116 to determine that the input was received at time T(2) and the change in content occurred at time T(3). For example, and with regards to the data received from the second sensor, the electronic device 102 (and/or the remote system(s) 104) may analyze the audio data to determine that the audio data represents the second sound 414. In some instances, the electronic device 102 (and/or the remote system(s) 104) may then determine the latency as the difference in time between time T(2) and time T(3).

Although the example of FIG. 4C illustrates the second sensor 116 as detecting audible sound, in other examples, the second sensor 116 may be configured to detect ultrasound (e.g., sound that cannot be heard by humans). For example, the sound 414 being output by the display device 108 may include ultrasound that the second sensor 116 is able to detect, but the user is not. This way, the change in content cannot be detect by the user controlling the network application.

Figure 5:
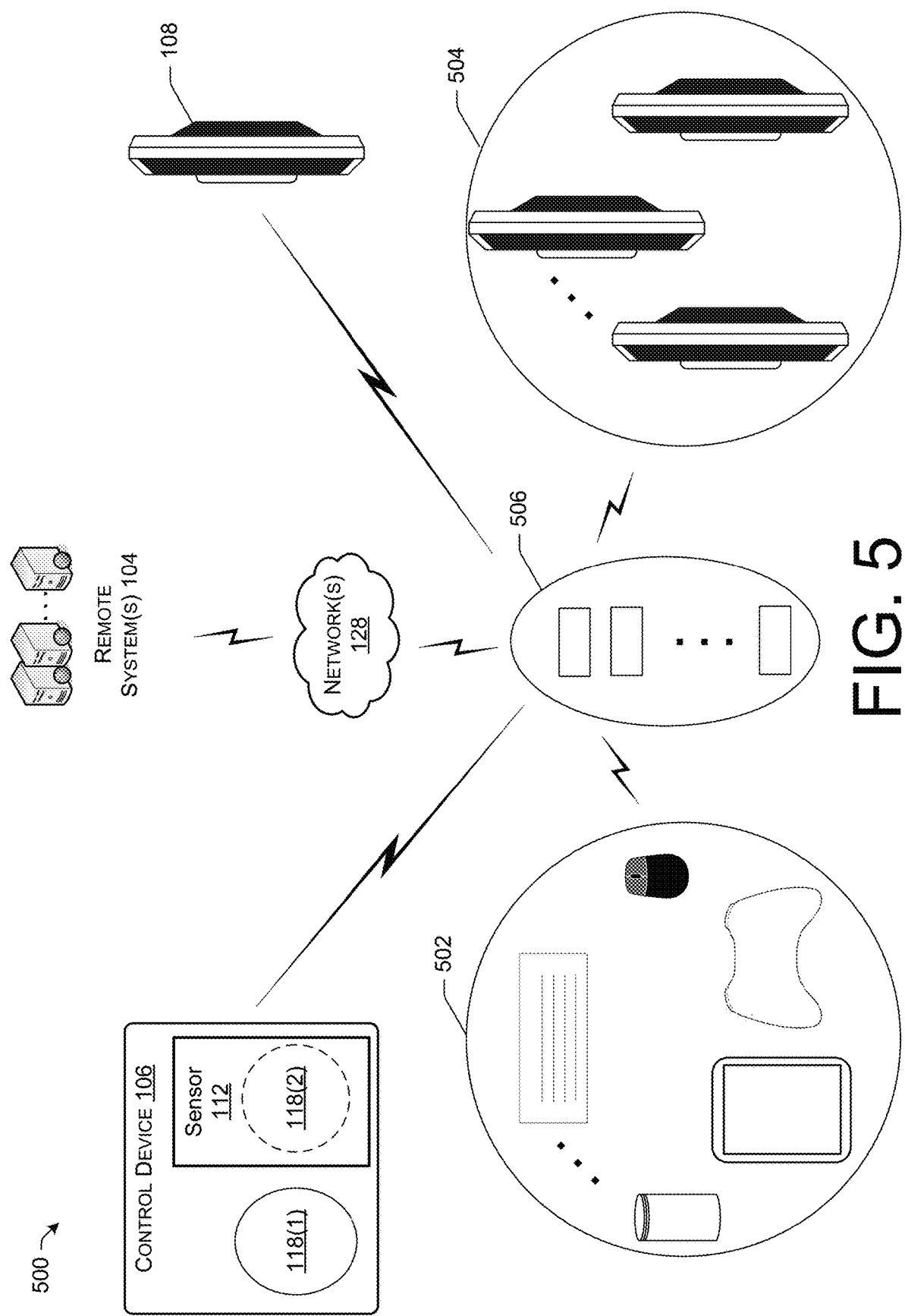
FIG. 5 illustrates a schematic diagram of determining latency for a multiplayer network application, according to various examples of the present disclosure.

FIG. 5 illustrates a schematic diagram of an example system 500 for determining a latency for a multiplayer network application, according to various examples of the present disclosure. The system 500 may include, for example, the control device 106, the remote system(s) 104, the display device 108, additional control device(s) 502 (which may be similar to the control device 106), additional display device(s) 504 (which may be similar to the display device 108), and electronic devices(s) 506 (which include the electronic device 102). In the example of FIG. 5, the control device 106 and one or more of the additional control device(s) 502 may be controlling an application provided by the remote system(s) 104.

For example, the remote system(s) 104 may receive, over the network(s) 128, input data from the control device 106 and the one or more additional control device(s) 502. The remote system(s) 104 may then update, using the input data, a state of an application. Additionally, the remote system(s) 104 may send, to the display device 108 and/or the additional display device(s) 504, video data and/or audio data that represents the state of the application. In some instances, video data and/or audio data may include first video data and first audio data associated with the display device 108, second video data and second audio data associated with a first additional display device 504, third video data and third audio data associated with a second additional display device 504, and/or so forth.

In some instances, such as when a user associated with the control device 106 is playing a network application, such as a network gaming application, one or more of the additional control device(s) 502, one or more of the additional display device(s) 504, and one or more of the electronic device(s) 506 may be located remotely from the user. However, the one or more additional control device(s) 502, the one or more additional display device(s) 504, the one or more electronic device(s) 506, and the remote system(s) 104 may perform the techniques described herein to update the state of the application for all of the users.

For example, such as when the application includes a gaming application, the remote system(s) 104 may store an authoritative version of the environment of the game. The remote system(s) 104 may then use the input data from the control devices 108 and 502 to update the positions of objects (e.g., characters, vehicles, buildings, etc.) within the environment. As such, the data representing a local state of the application that is associated with a control device, such as the control device 106, may represent the position(s) of object(s) that are controlled by the control device.

For example, a first local state of the application associated with the control device 106 may be different than a second local state of the application associated with an additional control device 502. For example, such as during a multiplayer network game, the first local state of the application associated with the control device 106 may represent a first position of a first object within a gaming environment, where the control device 106 is configured to control the first object. As such, the display device 108 may be displaying image(s) that represent the first local state of the application. Furthermore, the second local state of the application associated with the additional control device 502 may represent a second position of a second object within the gaming environment, where the additional control device 502 is configured to control the second object. As such, an additional display device 504 (and/or the display device 108) may be displaying image(s) that represent the second local state of the application.

In such instances, when the remote system(s) 104 updates the second local state of the application associated with the additional control device 502, such as by changing the position of the second object within the gaming environment, the remote system(s) 104 may further update the first local state of the application to include the updated position of the second object. As such, the first local state of the application may represent both the first position of the first object and the updated position of the second object.

As discussed above, in some instances, the control device 106 may be associated with both the display device 108 and one or more of the additional display devices 504. For example, as the remote system(s) 104 is receiving the input data from the control device 106 and updating the state of the application using the input data, the remote system(s) 104 may be sending, over the network(s) 128, data (e.g., video data, audio data, timestamp data, etc.) to the display device 108 and at least one additional display device 504. In some instances, the data sent to the display device 108 may be the same as the data that is sent to the additional display device 504. For example, the display device 108 and the additional display device 504 may be displaying similar content (e.g., image(s) representing the state of the application). Additionally, the display device 108 and the additional display device 504 may be receiving similar timestamp data that causes the display device 108 and the additional display device 504 to synchronize displaying of the content.

In some instances, the data sent to the display device 108 may be different than the data that is sent to the additional display device 504. For example, the display device 108 and the additional display device 504 may operate as a "split-screen" where the display device 108 displays a first portion of the content and the additional display device 504 displays a second portion of the content. Additionally, the display device 108 and the additional display device 504 may be receiving different timestamp data that causes the display device 108 and the additional display device 504 to synchronize displaying of the content.

In some instances, the control device 106 and one or more of the additional control device(s) 502 may be associated with the display device 108. For example, a first user may be using the control device 106 to control the application while a second user is using an additional control device 502 to control the application. For instance, the remote system(s) 104 may be receiving, over the network(s) 128, data (e.g., input data) from each of the control device 106 and the additional control device 502. The remote system(s) 104 may then update the state of the application using the data that is received from each of the control device 106 and the additional control device 502. Additionally, the remote system(s) 104 may be sending, over the network(s) 128, data (e.g., video data, audio data, timestamp data, etc.) to the display device 108, where the data represents the current state of the application.

In some instances, and in each of the examples described above, the control device 106 and one or more of the additional control devices 502 may be located in the same environment and/or the display device 108 and/or one or more of the additional display devices 504 may be located in the same environment. In some instances, and in each of the examples described above, the control device 106 and one or more of the additional control devices 502 may be located in separate environments and/or the display device 108 and/or one or more of the additional display devices 504 may be located in separate environments.

In the example of FIG. 5, the electronic devices 506 may be performing the processes described herein, with respect to the electronic device 102, to determine latencies associated with the multiplayer network application. Additionally, in some instances, the electronic devices 506 may send latency data to the remote system(s) 104, where the latency data indicates the latencies. The remote system(s) 506 may then use the latency data to determine which users have the highest latencies. Additionally, the remote system(s) 104 may use that determination to perform one or more actions.

Additionally, although not illustrated in the example of FIG. 5, the system 500 may include one or more other devices (e.g., one or more gaming consoles) that are communicating with the remote system(s) 104 in order to provide the multiplayer network application. The electronic devices 506 may still be able to perform the processes described herein in order to determine the latencies for the users.

Figure 7:
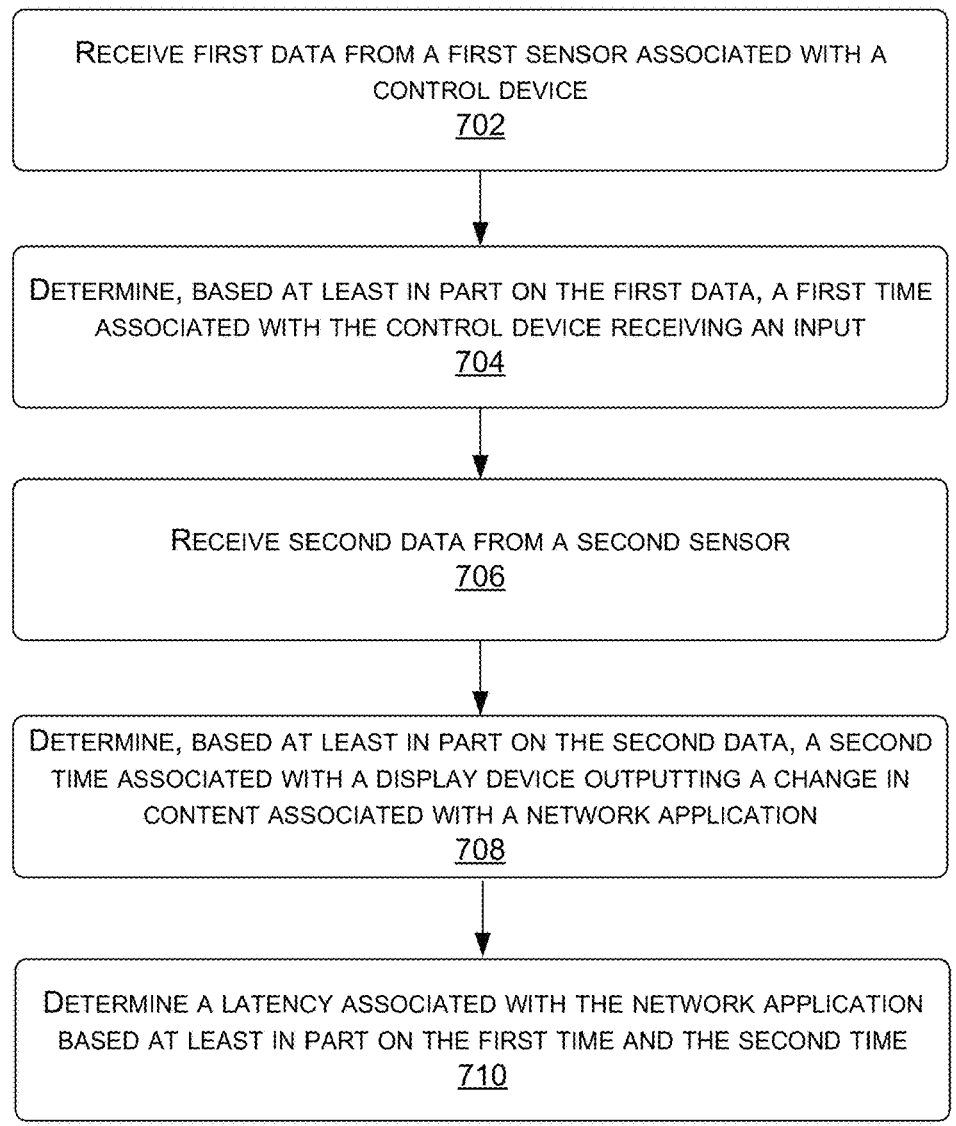
FIG. 7 illustrates an example process for determining a latency associated with a network application using a first sensor and a second sensor, according to various examples of the present disclosure.

FIGS. 6-7 illustrate various processes for determining latency associated with a network application. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 6 illustrates an example process 600 for determining a latency associated with a gaming application using a pressure sensor and a light sensor, according to various examples of the present disclosure. At 602, the process 600 may include receiving first data from a pressure sensor associated with a gaming controller. For instance, the electronic device 102 may receive, via a wired and/or wireless connection, the first data from the pressure sensor. In some instances, the electronic device 102 receives the first data based on the pressure sensor detecting a change in pressure, such as a user pressing on an input device of the gaming controller. In some instances, the electronic device 102 receives the first data by polling the pressure sensor for the first data.

At 604, the process 600 may include analyzing the first data to determine that an input device of the gaming controller received input. For instance, the electronic device 102 may analyze the first data to determine that the input device received the input. In some instance, the electronic device 102 analyzes the first data to determine a resistance associated with the pressure sensor. For instance, the resistance may increase as the pressure applied to the pressure sensor increases. The electronic device 102 may then determine that the input device received the input based at least in part on the resistance. For example, the electronic device 102 may determine that the input device received the input when the resistance satisfies (e.g., is equal to or greater than) a threshold resistance.

At 606, the process 600 may include generating a first timestamp representing a first time associated with the input device received the input. For instance, the electronic device 102 may generate the first timestamp based on determining that the input device received the input. In some instances, the first time is associated with when the input device received the input. Additionally, or alternatively, in some instances, the first time is associated with when the electronic device 102 received the first data from the pressure sensor. The electronic device 102 may then store timestamp data representing the first timestamp. In some instances, the electronic device 102 may send the timestamp data representing the first timestamp to one or more other devices.

At 608, the process 600 may include receiving second data from a light sensor. For instance, after receiving the first data from the pressure sensor, the electronic device 102 may receive the second data from the light sensor. The light sensor may be configured to monitor at least a portion of a display device to detect a brightness associated with the at least the portion of the display device. In some instances, the electronic device 102 receives the second data based on the light sensor detecting the change in brightness. In some instances, the electronic device 102 receives the second data by polling the light sensor for the second data.

At 610, the process 600 may include analyzing the second data to determine that the light sensor detected a change in content associated with a display device. For instance, the electronic device 102 may analyze the second data to determine that the light sensor detected the change in content. In some instances, to make the determination, the electronic device 102 may determine that the second data represents a change in brightness associated with the at least the portion of the display device. For example, the second data may represent a change from a first brightness to a second, different brightness. In some instance, the first brightness is brighter than the second brightness. In some instances, the second brightness is brighter than the first brightness.

At 612, the process 600 may include generating a second timestamp representing a second time associated with the light sensor detecting the change in content. For instance, the electronic device 102 may generate the second timestamp based at least in part on determining that the light sensor detected the change in content. In some instances, the second time is associated with when the light sensor detected the change in content. Additionally, or alternatively, in some instances, the second time is associated with when the electronic device 102 received the second data from the light sensor. The electronic device 102 may then store timestamp data representing the second timestamp. In some instances, the electronic device 102 may send the timestamp data representing the second timestamp to one or more other devices.

At 614, the process 600 may include determining a latency associated with a gaming application based at least in part on the first time and the second time. For instance, the electronic device 102 may determine the latency based on the first timestamp and the second timestamp. In some instances, the electronic device 102 determines the latency by taking a difference between the second time and the first time. In some instances, the electronic device continues to perform these processes to determine one or more additional latencies and/or to determine an average latency associated with the gaming application.

At 616, the process 600 may include causing an indication of the latency to be presented. For instance, the electronic device 102 may cause the indication of the latency to be presented. In some instances, to cause the indication of the latency to be presented, the electronic device 102 may display the indication of the latency to the user. In some instances, to cause the indication of the latency to be presented, the electronic device 102 may send latency data representing the latency to another device, such as the display device, which then displays the indication of the latency to the user.

FIG. 7 illustrates an example process 700 for determining a latency associated with a network application using a first sensor and a second sensor, according to various examples of the present disclosure. At 702, the process 700 may include receiving first data from a first sensor associated with a control device. For instance, the electronic device 102 may receive the first data. In some instances, the first sensor is a pressure sensor located on at least one input device of the control device and/or located within the control device. In other instances, the first sensor is a different type of sensor that is capable of detecting input to at least one input device. For example, the first sensor may include a motion sensor that detects input to at least one input device.

At 704, the process 700 may include determining, based at least in part on the first data, a first time associated with the control device receiving an input. For instance, the electronic device 102 may analyze the first data to determine the first time that the control device received the first input and/or the first time that the electronic device 102 received the first data. In some instances, the electronic device 102 may further analyze the first data to determine the type of input received by the control device. For instance, the electronic device 102 may determine which input device received the input. In some instances, the electronic device 102 generates a timestamp representing the first time.

At 706, the process 700 may include receiving second data from a second sensor. For instance, the electronic device 102 may receive the second data. In some instances, the second sensor includes a light sensor that detects changes in light associated with a display device. In some instances, the second sensor includes a microphone that detects changes in sound being output by the display device. Still, in some instances, the second sensor includes another type of sensor that detects changes in content being output by the display device.

At 708, the process 700 may include determining, based at least in part on the second data, a second time associated with a display device outputting a change in content associated with a network application. For instance, the electronic device 102 may analyze the second data to determine the change in content. In some instances, if the second sensor includes a light sensor, the electronic device 102 may determine the change in content by determining that the second data represents a change in brightness associated with the display device. In some instances, if the second sensor is a microphone, the electronic device 102 may determine the change in content by determining that the second data represents a specific sound.

In some instances, the electronic device 102 may also determine that the change in content is associated with the type of input. For example, the electronic device 102 may determine that the input device that received the input caused the change in content. Still, in some instances, the electronic device 102 may generate a timestamp that represents the second time.

At 710, the process 700 may include determining a latency associated with the network application based at least in part on the first time and the second time. For instance, the electronic device 102 may determine the latency based on the first time and the second time. In some instances, the electronic device 102 determines the latency by taking a difference between the second time and the first time. In some instances, the electronic device continues to perform these processes to determine one or more additional latencies and/or to determine an average latency associated with the network application.

While the examples of FIGS. 6 and 7 describe the electronic device 102 as performing the example processes 600 and 700, in other examples, another device may perform the example processes 600 and 700. For example, the remote system(s) 104, the control device 106, and/or the display device 108 may perform the example processes 600 and 700.

While the foregoing invention is described with respect to the specific examples, it is to be understood that the scope of the invention is not limited to these specific examples. Since other modifications and changes varied to fit particular requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An electronic device comprising:
   a pressure sensor configured to attach to at least an input device of a gaming controller, the gaming controller for controlling a network game;
   a light sensor configured to monitor at least a portion of a display device, the display device presenting content associated with the network game;
   one or more processors; and
   one or more computer-readable media storing instructions that, when executed by the one or more processors, cause the electronic device to perform operations comprising:
   receiving, via a first wired connection, first data from the pressure sensor;
   analyzing the first data to determine that the input device of the gaming controller received an input;
   generating a first timestamp representing a first time that the pressure sensor detected the input to the input device;
   receiving, via a second wired connection, second data from the light sensor;
   analyzing the second data to determine that the light sensor detected a change in light associated with the at least the portion of the display, the change in light caused by the input to the input device;
   generating a second timestamp representing a second time that the light sensor detected the change in light;
   determining a latency associated with the network game by taking a difference between the second time represented by the second timestamp and the first time represented by the first timestamp; and
   causing an indication of the latency to be presented.

2. The electronic device as recited in claim 1, the operations further comprising:
   generating a third timestamp representing a third time that the input device of the gaming controller received an additional input;
   generating a fourth timestamp representing a fourth time that the light sensor detected an additional change in light associated with the at least the portion of the display;
   determining an additional latency associated with the network game by taking a difference between the fourth time represented by the fourth timestamp and the third time represented by the third timestamp; and
   determining an average latency based at least in part on the latency and the additional latency.

3. The electronic device as recited in claim 1, the operations further comprising:
   receiving, via the second wired connection, third data from the light sensor; and
   analyzing the third data to determine that the light sensor detected a first brightness of light associated with the at least the portion of the display,
   wherein analyzing the second data to determine that the light sensor detected the change in light associated with the at least the portion of the display comprises:
   analyzing the second data to determine that the light sensor detected a second brightness of light associated with the at least the portion of the display; and
   determining that the second brightness of light is different than the first brightness of light.

4. A method comprising:
   receiving first data from a first sensor attached to a control device;
   determining, based at least in part on the first data, a first time associated with the control device receiving an input for a network application;
   receiving second data from a second sensor;
   determining, based at least in part on the second data, a second time associated with a display device outputting a change in content associated with the network application; and
   determining a latency associated with the network application based at least in part on the first time and the second time.

5. The method as recited in claim 4, further comprising:
   generating a first timestamp representing the first time, the first time representing at least one of when the control device received the input or when the first data was received; and
   generating a second timestamp representing a second time, the second time representing at least one of when the display device outputted the change in content or when the second data was received.

6. The method as recited in claim 4, wherein determining the latency associated with the network application comprises determining a difference between the second time and the first time.

7. The method as recited in claim 4, wherein the first sensor is a pressure sensor, and wherein determining the first time associated with the control device receiving the input comprises:
analyzing the first data to determine that the pressure sensor detected an increase in pressure; and
determining that the input device received the input based at least in part on the pressure sensor detecting the increase in pressure.

8. The method as recited in claim 4, wherein the second sensor is a light sensor, and wherein determining the second time associated with the display device outputting the change in content comprises:
before receiving the second data, receiving third data from the light sensor;
analyzing the third data to determine that the third data represents a first brightness of light; and
analyzing the second data to determine that the second data represents a second brightness of light at the second time, the second brightness of light being different than the first brightness of light.

9. The method as recited in claim 4, wherein the second sensor is a microphone, and wherein determining the second time associated with the display device outputting the change in content comprises analyzing the second data to determine that the second data represents a predefined sound.

10. The method as recited in claim 4, wherein the second sensor is an imaging device, and wherein determining the second time associated with the display device outputting the change in content comprises:
before receiving the second data, receiving third data from the imaging device;
analyzing the third data to determine that the third data represents an object located at a first location;
analyzing the second data to determine that the second data represents the object located at a second location at the second time; and
determining a motion of the object based at least in part on the first location and the second location, the motion of the object being associated with the input.

11. The method as recited in claim 4, further comprising:
receiving third data from a third sensor;
determining, based at least in part on the third data, a third time associated with the control device receiving an additional input;
receiving fourth data from the second sensor;
determining, based at least in part on the fourth data, a fourth time associated with the display device outputting an additional change in content associated with the network application; and
determining an additional latency associated with the network application based at least in part on the third time and the fourth time.

12. The method as recited in claim 11, further comprising determining an average latency based at least in part on the latency and the additional latency.

13. The method as recited in claim 4, further comprising causing at least one of the display device or an electronic device to present an indication of the latency.

14. The method as recited in claim 4, further comprising:
determining that the first data represents a type of input associated with the control device;
determining that the change in content represented by the second data is associated with the type of input; and
determining that the first data is associated with the second data,
wherein determining the latency is further based at least in part on determining that the first data is associated with the second data.

15. The method as recited in claim 4, wherein:
the first sensor is a pressure sensor;
receiving the first data comprises receiving, from the pressure sensor and using a first wired connection, the first data indicating that the control device received an input;
the second sensor is a light sensor; and
receiving the second data comprises receiving, from the light sensor and using a second wired connection, the second data indicating the change in content associated with the network application being output by the display device.

16. The method as recited in claim 4, further comprising:
polling the first sensor for the first data at a first frequency, wherein receiving the first data is based at least in part on polling the first sensor; and
polling the second sensor for the second data at the first frequency or a second frequency, wherein receiving the second data is based at least in part on polling the second sensor.

17. An electronic device comprising:
one or more processors; and
one or more computer-readable media storing instructions that, when executed by the one or more processors, cause the electronic device to perform operations comprising:
receiving, at a first time, first sensor data from a first sensor attached to a control device, the first data indicating that the control device received an input associated with a network application;
receiving, at a second time, second sensor data from a second sensor, the second sensor data indicating a change in content being output by a display device; and
determining a latency associated with the network application based at least in part on the first time and the second time.

18. The electronic device as recited in claim 17, the operations further comprising:
based at least in part on receiving the first data, generating a first timestamp representing the first time; and
based at least in part on receiving the second data, generating a second timestamp representing a second time.

19. The electronic device as recited in claim 17, wherein determining the latency associated with the network application comprises determining a difference between the second time and the first time.

20. The electronic device as recited in claim 17, wherein the first sensor is a pressure sensor and the second sensor is a light sensor, and wherein the operations further comprise:
analyzing the first data to determine that the pressure sensor detected an increase in pressure;
determining that the input device received the input based at least in part on the pressure sensor detecting the increase in pressure;
receiving, at a third time, third data from the light sensor;

analyzing the third data to determine that the light sensor detected a first brightness of light; and analyzing the second data to determine that the light sensor detected a second brightness of light, the second brightness of light being different than the first brightness of light.

\* \* \* \* \*